A. A. HOUGHTON.
Scale-Beam.
No. 213,332.   Patented Mar. 18, 1879
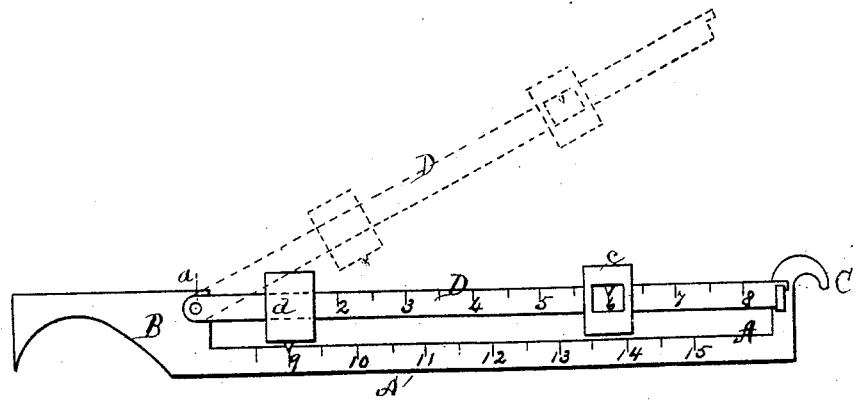

UNITED STATES PATENT OFFICE.

ALFRED A. HOUGHTON, OF BUFFALO, NEW YORK, ASSIGNOR TO THE BUFFALO SCALE COMPANY, OF SAME PLACE.

IMPROVEMENT IN SCALE-BEAMS.

Specification forming part of Letters Patent No. 213,332, dated March 18, 1879; application filed October 22, 1878.

*To all whom it may concern:*

Be it known that I, ALFRED AUGUSTUS HOUGHTON, of Buffalo, in the county of Erie and State of New York, have invented new and useful Improvements in the Beams of Weighing-Scales, of which the following is a specification:

This is an improvement on combination-beams; and the object of the invention is to combine two (or more) beams into a small space, making them practically one beam, one of the beams being hinged or pivoted to the beam-head, so as to swing up and down, and with two (or more) poises thereon which will slide on or off this beam, the object of this being to allow the poises to be removed when the beam or scale is to be sealed or tested.

The beams will be notated or marked consecutively from one to the other, or one may have two or more lines of figures thereon; but the poises will only be on the swinging beam, and each poise will point to a different line of figures, all as hereinafter fully specified.

In the drawing, the figure represents a side elevation, A being the main beam, generally constructed in one piece with the beam-head B and nose C. Above this (or it may be below) is a beam, D, its back end hinged or pivoted to the beam-head at *a*, the other end resting on a pin, *b*, or any equivalent device for that end of the beam to rest on, and allow it to be swung up and down (or outward) when required, as shown in dotted lines in the drawing.

*c* is the first poise on the hinged beam D. This is provided with a pointer that indicates the weight on this beam, and is moved (first) until the line of figures on this beam is exhausted. Then the second poise, *d*, behind it on the same beam, is moved forward. This poise is elongated, so that its pointer on the end comes over the face of the lower beam, and wherever it is stopped indicates the weight of whatever is on the scale. If two lines of figures are marked on this lower beam, a third poise will be used, the index sufficiently elongated to point to the lower line of figures on the beam A.

It is obvious that as many poises may be used as there are lines of figures.

The hinged beam D may, for convenience, be the lower, and the beam A the upper, but the principle and operation of the two will be the same. The hinged beam D, in addition to its own line of figures, is the sole poise-carrying beam, having not only a poise for its own line of figures, but one for every other line on the beam or beams below it, each poise having its own line of figures. This is not merely a bar on which the poise slides, but a weighing-beam as well.

The advantages of this beam being hinged, and which I consider very important, are:

First, in a scale with two or more poises on a single beam, each poise must be sealed separately, and when the first poise is run out to the end of the beam it is necessary to have on the scale a weight sufficient to balance it. Then, to seal the second poise, additional weight must be put on the scale up to the entire weighing capacity of the scale, sometimes amounting to tons. This causes great inconvenience and labor in handling the weights, especially, as it often happens, the sealing must be done in the country, and where a solid poise is used there is no other way but to take the beam apart. Where the poises are made in two parts they can be detached by unscrewing and taking them off in separate parts, which is very disadvantageous, as some of the filling of the poise may drop out and be lost, or in putting the poise together again on the beam it is likely not to adjust exactly as it was before, causing a difference in weighing.

Second, having the beam loose at one end, different poises may be slipped on or off as desired, which will be very important to use with poises of different weights for the same line of figures, said poises indicating quantities of different commodities—such as corn, wheat, oats, coal, or oil—as applied by me.

Third, enabling any one to ship off one or more of the poises to test the other poises when any doubt is expressed as to the accuracy of their scale, as by testing the front poise and then taking it off, the next poise can be run out the same distance and compared readily.

The beam D can be hinged at the other end instead of to the beam-head; but I prefer it as shown.

I do not claim a scale-beam having bars attached by removable screws thereto, as shown in patent of Thaddeus Fairbanks, April 4, 1876, No. 175,597; but What I do claim, and desire to secure by Letters Patent, is—

1. The combination of a scale-beam having a catch near its outer end with a pivoted supplementary beam or bar, which is permanently secured to said beam, and provided with a projection at its outer end for engaging with said catch, said supplementary beam being allowed free upward vibration on its pivot, but held against all other motion.

2. The combination, with a scale-beam, of a supplementary beam pivoted by one end thereto, said supplementary beam being allowed free upward motion at its other end, but held against all other motion.

3. In a double beam or compound beam-scale, two or more poises moving on a single beam, one poise only pointing to a single line of figures on its own beam, and the other poise (or poises) pointing to figures on a beam (or beams) above or below the poise-beam, substantially as specified.

In witness whereof I have hereunto signed my name in the presence of two subscribing witnesses.

A. A. HOUGHTON.

Witnesses:
 J. R. DRAKE,
 T. H. PARSONS.